US008472757B2

(12) United States Patent
Shiiyama et al.

(10) Patent No.: US 8,472,757 B2
(45) Date of Patent: Jun. 25, 2013

(54) IMAGE SEARCH WITH FEATURE POINT TRANSFORMATION

(75) Inventors: Hirotaka Shiiyama, Yokohama (JP); Hidetomo Sohma, Yokohama (JP); Koichi Magai, Tokyo (JP); Masahiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/768,559

(22) Filed: Apr. 27, 2010

(65) Prior Publication Data

US 2010/0296736 A1    Nov. 25, 2010

(30) Foreign Application Priority Data

May 25, 2009    (JP) .................................. 2009-125844

(51) Int. Cl.
*G06K 9/54*    (2006.01)
(52) U.S. Cl.
USPC ........................................... 382/305; 382/294
(58) Field of Classification Search
None
See application file for complete search history.

(56) References Cited

U.S. PATENT DOCUMENTS

| 7,403,634 | B2 * | 7/2008 | Nishiura ........................ 382/103 |
| 7,463,290 | B2 | 12/2008 | Tojo et al. |
| 7,660,468 | B2 * | 2/2010 | Gokturk et al. ............... 382/224 |
| 2003/0026594 | A1 | 2/2003 | Shiiyama |
| 2007/0003165 | A1 * | 1/2007 | Sibiryakov et al. ........... 382/294 |
| 2008/0013836 | A1 | 1/2008 | Nakamura et al. |
| 2008/0144943 | A1 * | 6/2008 | Gokturk et al. ............... 382/224 |
| 2008/0144972 | A1 * | 6/2008 | Kang et al. .................... 382/294 |
| 2008/0281797 | A1 * | 11/2008 | Hori ................................. 707/3 |
| 2009/0290798 | A1 * | 11/2009 | Sakai et al. .................... 382/195 |
| 2010/0074530 | A1 * | 3/2010 | Magai et al. ................... 382/195 |
| 2010/0104197 | A1 * | 4/2010 | Sohma et al. .................. 382/195 |
| 2010/0299355 | A1 * | 11/2010 | Shiiyama et al. .............. 707/769 |

FOREIGN PATENT DOCUMENTS

| EP | 1933270 A1 * | 6/2008 |
| JP | 2006-65399 A | 3/2006 |
| JP | 2007-334795 A | 12/2007 |
| JP | 2009-093595 A | 4/2009 |

OTHER PUBLICATIONS

C. Harris, et al., "A Combined Corner and Edge Detector", in Alvey Vision Conference, pp. 147-152, 1988.
J.J. Koenderink, et al., "Representation of Local Geometry in the Visual System", Biological Cybernetics, vol. 55, pp. 367-375, 1987.
Japanese Office Action issued on Feb. 18, 2013, concerning Japanese Patent Application No. 2009-125844.

\* cited by examiner

*Primary Examiner* — Barry Drennan
*Assistant Examiner* — Andrew Moyer
(74) *Attorney, Agent, or Firm* — Fitzpatrick, Cella, Harper & Scinto

(57) ABSTRACT

An image search apparatus, which determines a similarity between an input query image and a registered comparison destination image and searches an image similar to the query image, extracts a plurality of corresponding pairs of feature points in two images based on feature points selected from the both images. A coordinate transformation coefficient to execute a coordinate transformation process is decided so that coordinates of the feature point of one of the two images match coordinates of the feature point of the other image, in relation to each pair. Only if an amount of transformation of coordinates satisfies the constraint conditions designated in advance, the coordinate transformation process using the coordinate transformation coefficient is executed in relation to the plurality of pairs of feature points, and coordinates of the feature points after the transformation of one image are compared with coordinates of the corresponding feature points of the other image.

11 Claims, 9 Drawing Sheets

FIG. 7

| LIST OF AFFINE TRANSFORM MATRICES | | | | | | |
|---|---|---|---|---|---|---|
| | a | b | c | d | e | f |
| TRANSLATION | 1 | 0 | 0 | 1 | M | n |
| ROTATION | $\cos\theta$ | $\sin\theta$ | $-\sin\theta$ | $\cos\theta$ | 0 | 0 |
| ENLARGEMENT / REDUCTION | s | 0 | 0 | s | 0 | 0 |
| SHEAR | 1 | b | c | 1 | 0 | 0 |
| MIRROR IMAGE CONVERSION | -1 | 0 | 0 | 1 | 0 | 0 |

FIG. 8

☐ DESIGNATE ENLARGEMENT / REDUCTION RANGE ☐ % TO ☐ %

☐ DESIGNATE ROTATION ANGLE RANGE ☐ DEGREE TO ☐ DEGREE, CLOCKWISE

☐ DESIGNATE TRANSLATION RANGE ☐ PIXEL TO ☐ PIXEL, MOVE RIGHT

☐ PIXEL TO ☐ PIXEL, MOVE UP

FIG. 9

- ☐ DESIGNATE ENLARGEMENT / REDUCTION RANGE  [  ] % TO  [  ] %
- ☐ DESIGNATE ROTATION ANGLE RANGE  [  ] DEGREE TO  [  ] DEGREE, CLOCKWISE
- ☐ DESIGNATE TRANSLATION RANGE  [  ] PIXEL TO  [  ] PIXEL, MOVE RIGHT
  [  ] PIXEL TO  [  ] PIXEL, MOVE UP

- ☐ SEARCH MIRROR IMAGE CONVERSION
- ☐ DO NOT SEARCH DEFORMATION

IMAGE SEARCH WITH FEATURE POINT TRANSFORMATION

BACKGROUND OF THE INVENTION

1. Field of the Invention

The present invention relates to an image search technique based on the degree of similarity of feature points in images.

2. Description of the Related Art

In general, the image search corresponding to the rotation of an image is performed by obtaining a feature amount after the rotation of a query image, or by using a feature amount after rotational transform.

Japanese Patent Laid-Open No. 2006-065399 is an example of a conventionally proposed image search technique based on the degree of similarity of feature points in images. According to the document, feature points similar to a pair of feature points randomly selected from a query image are obtained from a registered image in the image search based on the comparison of local features. A geometric transformation function between the query image and the registered image is then obtained based on the positional relationship between the pair of feature points. Corresponding feature points in the registered image existing at places after the transformation of feature points other than the pair based on the geometric transformation function are counted to determine the similarity.

In the process, if the feature points similar to the pair existing in the registered image do not correctly correspond to the pair of feature points randomly selected from the query, the process of applying the geometric transform to the feature points of the query image is significantly slow. Furthermore, if the feature points do not appear at the same locations in the registered image, the method of selecting the feature points is determined to be wrong, and a pair of feature points is randomly selected again from the query image.

More specifically, the image searching process of Japanese Patent Laid-Open No. 2006-065399 is a process in which the process from the selection of feature points to the geometric transformation is executed for a large number of times with an expectation that an appropriate pair of feature points is included in the processes. Therefore, a large amount of processing cost is required, and improvement is necessary. Furthermore, since the feature points are randomly selected, there is a problem that the reproducibility of a search result (including calculation with the same degree of similarity) is poor if the number of repetitions is small.

Furthermore, the process becomes slower when the processing result is processed to narrow down the search result based on the rotation angle or the enlargement/reduction ratio.

SUMMARY OF THE INVENTION

The present invention has been made in view of the foregoing problems, and according to a preferred embodiment, provided are an image search apparatus and a method thereof capable of increasing the number of repetitions of selection of feature points from a query without increasing the process load.

According to one aspect of the present invention, there is provided an image search apparatus that determines a similarity between an input query image and a registered comparison destination image and that searches an image similar to the query image, the image search apparatus comprising:

an extraction unit configured to extract a plurality of corresponding pairs of feature points in two images, the query image and the comparison destination image, by associating feature points selected from the query image and feature points of the comparison destination image based on feature amounts of the feature points;

an acquisition unit configured to acquire at least two pairs of feature points from the plurality of pairs of feature points;

a decision unit configured to decide a coordinate transformation coefficient for performing transformation so that coordinates of the feature point of one of the two images match coordinates of the feature point of the other image, in relation to each pair of the at least two pairs of feature points;

a determination unit configured to determine whether an amount of transformation of the coordinates by a coordinate transformation process using the coordinate transformation coefficient decided by the decision unit satisfies constraint conditions designated in advance; and a comparison unit configured to transform the coordinates of the feature points of the one of the images by the coordinate transformation process using the coordinate transformation coefficient in relation to the plurality of pairs of feature points only if the determination unit determines that the constraint conditions are satisfied and configured to compare the coordinates of the feature points after the transformation with the coordinates of the corresponding feature points of the other image to determine the similarity between the two images.

Also, according to another aspect of the present invention, there is provided an image search method for determining a similarity between an input query image and a registered comparison destination image and for searching for an image similar to the query image, the image search method comprising:

an extraction step of extracting a plurality of corresponding pairs of feature points in two images, the query image and the comparison destination image, by associating feature points selected from the query image and feature points of the comparison destination image based on feature amounts of the feature points;

an acquisition step of acquiring at least two pairs of feature points from the plurality of pairs of feature points;

a decision step of deciding a coordinate transformation coefficient for performing transformation so that coordinates of the feature point of one of the two images match coordinates of the feature point of the other image, in relation to each pair of the at least two pairs of feature points;

a determination step of determining whether an amount of transformation of the coordinates by a coordinate transformation process using the coordinate transformation coefficient decided in the decision step satisfies constraint conditions designated in advance; and a comparison step of transforming the coordinates of the feature points of the one of the images by the coordinate transformation process using the coordinate transformation coefficient in relation to the plurality of pairs of feature points only if it is determined in the determination step that the constraint conditions are satisfied and of comparing the coordinates of the feature points after the transformation with the coordinates of the corresponding feature points of the other image to determine the similarity between the two images.

Further features of the present invention will become apparent from the following description of exemplary embodiments with reference to the attached drawings.

BRIEF DESCRIPTION OF THE DRAWINGS

FIG. 7 is a diagram showing a relationship between an affine transform coefficient and a geometric transformation.

FIG. 8 is a diagram showing an example of a user interface (UI) for providing constraints to the geometric transformation.

FIG. 9 is a diagram showing an example of a user interface (UI) for providing constraints to the geometric transformation.

DESCRIPTION OF THE EMBODIMENTS

Figure 1:
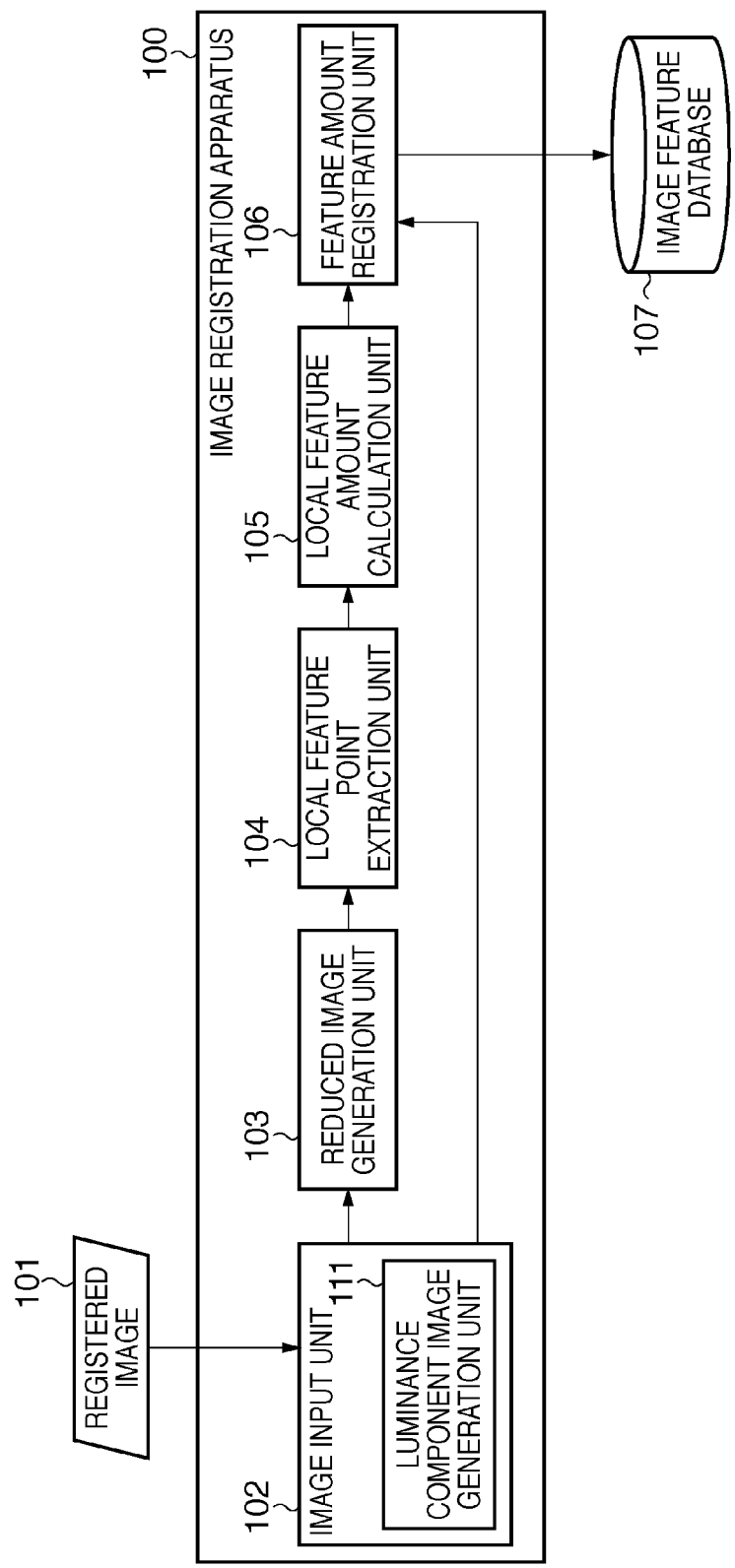
FIG. 1 is a block diagram showing an example of configuration of an image registration apparatus according to an embodiment.

A preferred embodiment of the present invention will now be described with reference to the attached drawings.

Summary of Embodiment

In an image search method based on feature points of the present invention, rotation-invariant feature points and rotation-invariant feature amounts are used. As in the conventional technique, at the registration, feature points of a registered image are decided, and feature amounts relative to the feature points are stored. The process will be described later with reference to FIGS. 1, 3, and 4.

During the search, at least two points are selected from the feature points of a query image, corresponding feature points in a comparison destination image are obtained, and affine transform functions based on the coordinates of at least two pairs of feature points are decided. To obtain the similarity between the two images, the affine transform is applied to the coordinates of a feature point group of the image of one of the query image and the comparison destination image, and the coordinates are compared with the coordinates of a feature point group of the other image. The process will be described in detail with reference to FIGS. 2, 4, 5, 6A and 6B.

Whether preset constraint conditions are satisfied is determined in relation to conversion elements, such as ratio of enlargement/reduction, rotation angle, amount of translation, presence of deformation, and presence of mirror image conversion, in the affine transform coefficients decided as described above. The processes after the affine transform are executed only if the constraint conditions are determined to be satisfied. In this way, the affine transform processes of feature points with heavy calculation load can be reduced, and it is convenient that a narrow-down process is executed with minimum calculation cost. The process will be described in detail with reference to flow charts of FIGS. 6A and 6B (especially step S609).

For example, whether the amount of transformation (enlargement/reduction ratio) in relation to the enlargement/reduction by the affine transform is within a preferable range of enlargement/reduction ratio is determined based on a coefficient related to the enlargement/reduction among the affine transform coefficients. The processes after the affine transform in later stages are executed only if the amount of transformation is determined to be within the preferable range. In this way, it is convenient that the narrow-down process in relation to the enlargement/reduction ratio is executed with minimum calculation cost.

Instead of using the affine transform, the processes after the affine transform may be executed only if the enlargement/reduction ratio obtained from the ratio of distances between two selected feature points in the query image and the comparison destination image is within the range of an enlargement/reduction ratio designated in advance. In this case, the narrow-down process related to the enlargement/reduction ratio can be executed before the decision of the affine transform coefficients. It is convenient that the narrow-down process related to the enlargement/reduction ratio is executed with minimum calculation cost.

Furthermore, for example, whether the amount of transformation is within a preset preferable range of rotation angle is determined based on a coefficient related to the rotation among the affine transform coefficients. The processes after the affine transform of coordinates of the feature point group in the comparison destination image in later stages may be executed only if the amount of transformation is determined to be within the preferable range. In this case, it is convenient that the narrow-down process related to the rotation angle is executed with minimum calculation cost.

Furthermore, for example, whether the amount of transformation is within a range of a distance of translation designated in advance is determined based on a coefficient related to the translation among the affine transform coefficients. The processes after the affine transform in later stages may be executed only if the amount of transformation is determined to be within the preferable range. It is convenient that the narrow-down process related to the translation is executed with minimum calculation cost.

If the deformation is not to be searched based on the setting related to the deformation among the affine transform coefficients, the processes after the affine transform in later stages can be executed only if there is no deformation. It is convenient that the narrow-down process in relation to the deformation is executed with minimum calculation cost.

The user can easily designate the constraint conditions based on, for example, the user interfaces (UI) shown in FIGS. 8 and 9.

In this way, the number of repetitions of selections of pairs of feature points for deciding the affine transform coefficient can be increased without increasing the process load. This can contribute to the stability and reproducibility of search.

FIG. 1 is a block diagram showing an example of configuration of an image registration apparatus according to a first embodiment of the present invention. In FIG. 1, an image registration apparatus 100 comprises an image input unit 102, a reduced image generation unit 103, a local feature point extraction unit 104, a local feature amount calculation unit 105, and a feature amount registration unit 106. Reference numeral 101 denotes a registered image, which is an image registered by the image registration apparatus 100 in an image feature database described below. Reference numeral 107 denotes an image feature database, to which the image registration apparatus 100 registers image features extracted from the registered image 101.

Figure 2:
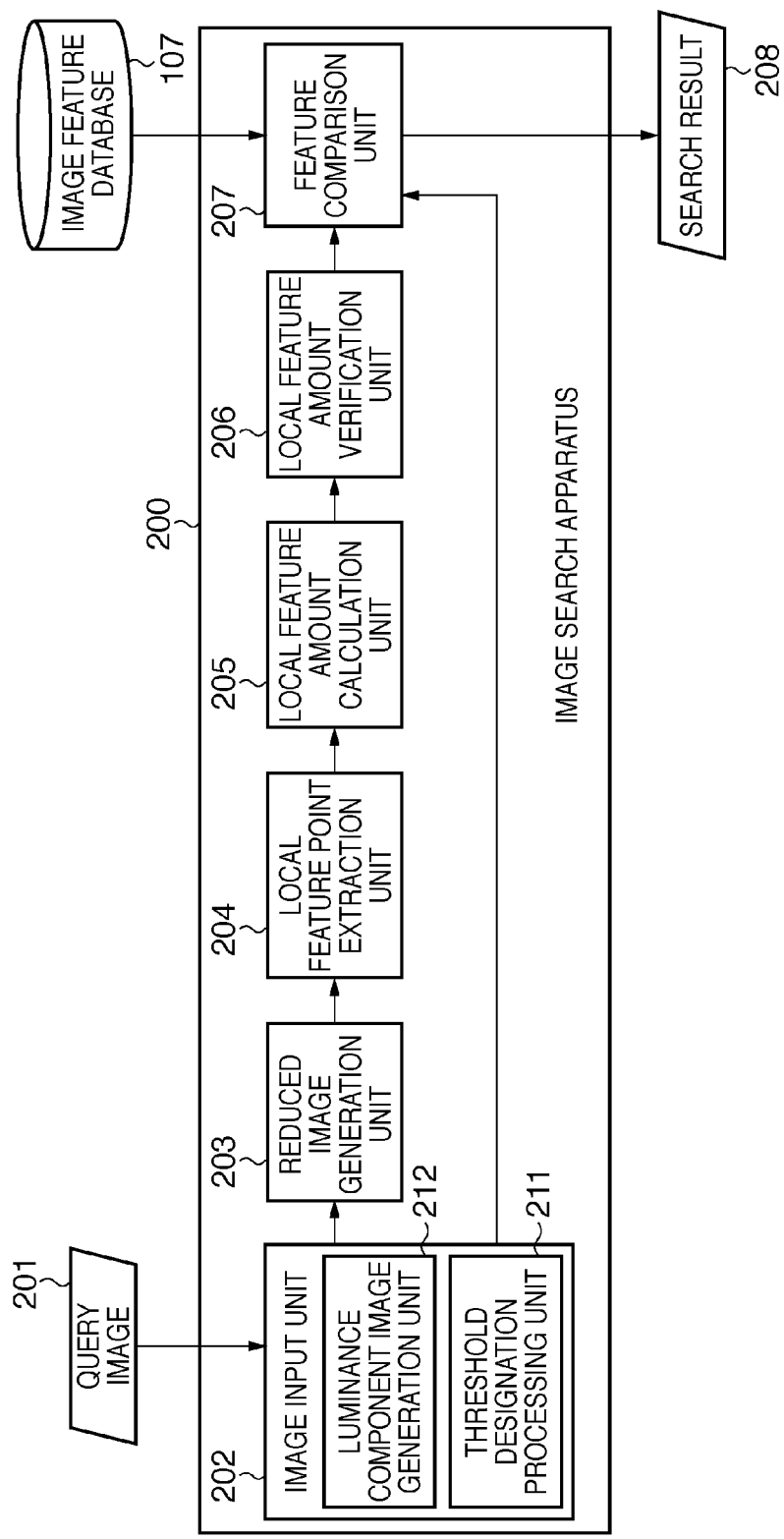
FIG. 2 is a block diagram showing an example of configuration of an image search apparatus according to the embodiment.

FIG. 2 is a block diagram showing an example of configuration of an image search apparatus according to the first embodiment of the present invention. In FIG. 2, an image search apparatus 200 comprises an image input unit 202, a reduced image generation unit 203, a local feature point extraction unit 204, a local feature amount calculation unit 205, a local feature amount verification unit 206, and a feature comparison unit 207. Reference numeral 201 denotes a query image. The image search apparatus 200 searches an image similar to the query image 201 from the image feature database 107. Reference numeral 208 denotes a search result image, which is an image outputted as a result of the search of the image feature database 107 by the image search apparatus 200.

Examples of operations of the image registration apparatus 100 and the image search apparatus 200 according to the present embodiment configured this way will now be described.

[Registration Processing of Image]

Figure 3:
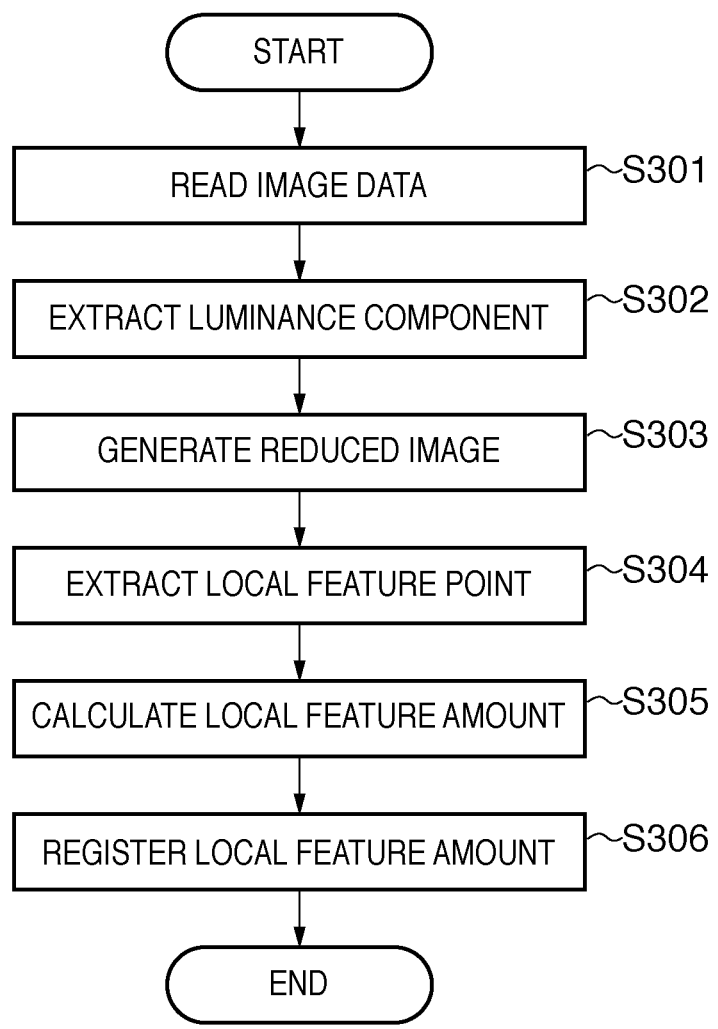
FIG. 3 is a flow chart showing a procedure of registration processing of an image according to the embodiment.

Registration processing of an image executed by the image registration apparatus 100 will be described first. FIG. 3 is a flow chart showing a procedure of the registration processing of an image. In step S301, the image input unit 102 reads the registered image 101. In step S302, a luminance component image generation unit 111 of the image input unit 102 extracts luminance components from the registered image 101 to generate a luminance component image and transmits the luminance component image to the reduced image generation unit 103. The image input unit 102 transmits the registered image 101 to the feature amount registration unit 106.

Figure 4:
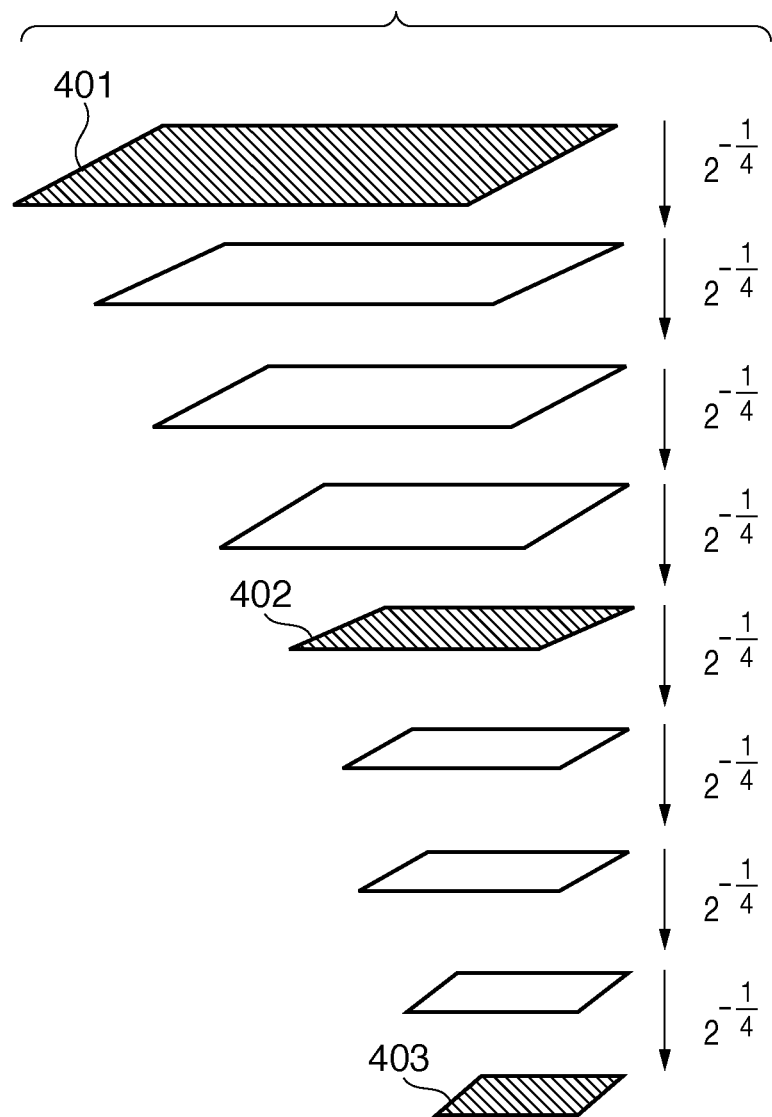
FIG. 4 is a diagram showing an example of reduced image generation.

In step S303, the reduced image generation unit 103 sequentially reduces the luminance component image transmitted from the image input unit 102 in accordance with a magnification p to generate n reduced images and transmits the generated reduced images to the local feature point extraction unit 104. However, the magnification p and the number of reduced images n are determined in advance. FIG. 4 is a diagram showing an example of the reduced image generation and shows an example of reduced images generated by the reduced image generation unit 103 when the magnification p is 2 to the −¼ power, and the number of reduced images is 9. In FIG. 4, reference numeral 401 denotes a luminance component image transmitted from the image input unit 102, reference numeral 402 denotes a reduced image reduced four times from the luminance component image in accordance with the magnification p, and reference numeral 403 denotes a reduced image reduced eight times from the luminance component image in accordance with the magnification p. In the example of FIG. 4, the reduced image 402 is an image in which the luminance component image transmitted from the image input unit 102 is reduced to ½, and the reduced image 403 is an image in which the luminance component image transmitted from the image input unit 102 is reduced to ¼. Although the reduced images according to the present embodiment are generated by a reduction method based on linear interpolation, other reduction methods may also be used.

In step S304, the local feature point extraction unit 104 extracts feature points, which are robustly extracted even if the image is rotated (rotation-invariant feature points), from each of the n reduced images transmitted from the reduced image generation unit 103. The local feature point extraction unit 104 then transmits the extracted rotation-invariant feature points to the local feature amount calculation unit 105. In the present embodiment, a Harris operator is used as an extraction method of the rotation-invariant feature points (C. Harris and M. J. Stephens, "A combined corner and edge detector," In Alvey Vision Conference, pages 147-152, 1988). Specifically, for a pixel on an output image H obtained by an action of the Harris operator, pixel values of the pixel and eight pixels around the pixel (nine pixels in total) are checked. The point in which the pixel is a local maximum (the pixel in the nine pixels with the maximum pixel value) is extracted as a rotation-invariant feature point. Even if the pixel is a local maximum, the pixel is not extracted as a rotation-invariant feature amount if the value of the pixel is smaller than a threshold. Not only the feature point extraction method used in the present embodiment, but any feature point extraction method can be applied to the local feature point extraction unit 104 as long as the rotation-invariant feature point can be extracted.

In step S305, the local feature amount calculation unit 105 calculates a local feature amount (rotation-invariant local feature amount), which is invariant after the rotation of the image, of each rotation-invariant feature point transmitted from the local feature point extraction unit 104. The extracted rotation-invariant local feature amount is associated with coordinate information and transmitted to the feature amount registration unit 106. In the present embodiment, LocalJet (J. J. Koenderink and A. J. van Doorn, "Representation of local geometry in the visual system," Riological Cybernetics, vol. 55, pp. 367-375, 1987) and a combination of derivatives of LocalJet are used as a calculation method of the rotation-invariant feature amount. Specifically, a rotation-invariant feature amount shown in Formula (1) is calculated.

[Expression 1]

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

Symbols used on the right side of Formula (1) are defined by Formulas (2) to (7) shown below. Formula (2) is a convolution operation of a Gaussian function and an image.

[Expression 2]

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{yy} = \frac{\partial^2 L}{\partial y^2} \quad (6)$$

$$L_{xx} = \frac{\partial^2 L}{\partial x^2} \quad (7)$$

Not only the feature amount calculation method used in the present embodiment, but any feature amount calculation method can be applied to the local feature amount calculation unit 105 as long as the rotation-invariant feature amount can be calculated.

In step S306, the feature amount registration unit 106 associates the rotation-invariant feature amount transmitted from the local feature amount calculation unit 105 and the registered image 101 transmitted from the image input unit 102 and registers the data in the image feature database 107. This completes the image registration processing by the image registration apparatus 100.

[Search Process of Image]

Figure 5:
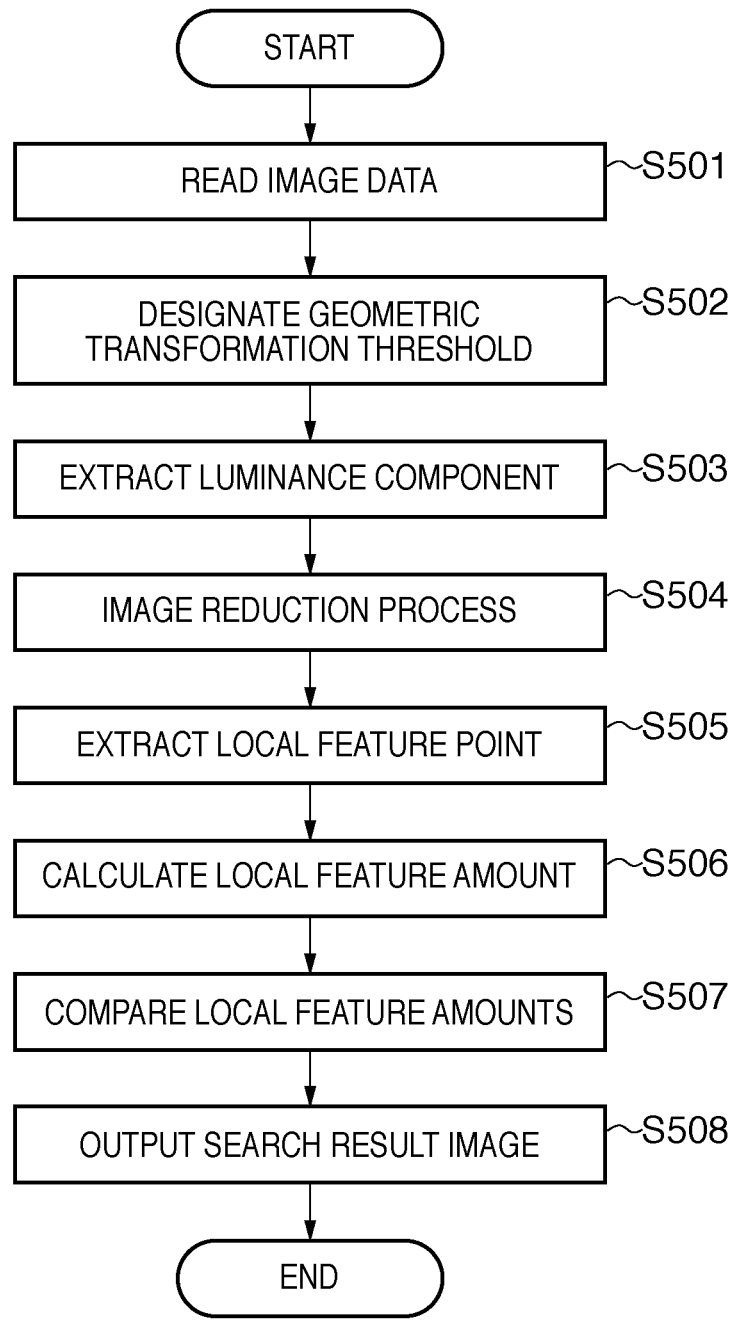
FIG. 5 is a flow chart showing a procedure of a search process of an image according to the embodiment.

A search process of image by the image search apparatus 200 will now be described. FIG. 5 is a flow chart showing a procedure of the search process of image according to the first embodiment.

In step S501, the image input unit 202 reads the query image 201. In step S502, the threshold designation processing unit 211 of the image input unit 202 receives a user designation of a range of enlargement ratio, a range of rotation angle, and a range of translation for the query image expected in the search result. However, not all three items have to be designated, and it is preferable to be able to designate a range of an item for which the user wants to set a limit to.

FIG. 8 shows an example of a user interface (UI) for providing constraints to the geometric transformation. Only the items checked in the check boxes are constrained, and for example, the constraints for the items are constrained by AND. It is obvious that the items can be designated by a logical expression. It is also obvious that the unconformity in the magnitude relationship between the ranges of the values input in the text boxes is checked, and the user is warned of the unconformity.

The threshold designation processing unit 211 temporarily stores the values of the designated constraints.

In step S503, the luminance component image generation unit 212 of the image input unit 202 extracts luminance components from the query image 201 to generate a luminance component image and transmits the generated luminance component image to the reduced image generation unit 203.

In step S504, the reduced image generation unit 203 sequentially reduces the luminance component image transmitted from the image input unit 202 in accordance with the magnification p, generates n reduced images, and transmits the reduced images to the local feature point extraction unit 204. The values of the magnification p and the number of reduced images n are the same as the values used in the registration processing of image by the image registration apparatus 100.

In step S505, the local feature point extraction unit 204 extracts feature points of image (rotation-invariant feature points) from each of the n reduced images transmitted from the reduced image generation unit 203. The extracted rotation-invariant feature points are transmitted to the local feature amount calculation unit 205. In the present embodiment, a Harris operator is used as an extraction method of the rotation-invariant feature points, as in the method used in the registration processing of image. More specifically, for a pixel on an output image H obtained by an action of the Harris operator, pixel values of the pixel and eight pixels around the pixel (nine pixels in total) are checked. The point in which the pixel is a local maximum (the pixel in the nine pixels with the maximum pixel value) is extracted as a rotation-invariant feature point. Even if the pixel is a local maximum, the pixel is not extracted as a rotation-invariant feature amount if the value of the pixel is smaller than a predetermined threshold. Not only the feature point extraction method used in the present embodiment, but any feature point extraction method can be applied to the local feature point extraction unit 204 as long as the rotation-invariant feature point can be extracted.

In step S506, the local feature amount calculation unit 205 calculates a local feature amount (rotation-invariant local feature amount), which is invariant after the rotation of the image, of each rotation-invariant feature point transmitted from the local feature point extraction unit 204. The extracted rotation-invariant local feature amount is associated with coordinate information and transmitted to the local feature amount verification unit 206. The same method as the method used in the registration processing of image is used as the calculation method of the rotation-invariant feature amount. More specifically, in the present embodiment, a combination of LocalJet and derivatives of LocalJet is used to calculate the rotation-invariant feature amount shown in Formula (1). The local feature amount verification unit 206 verifies the fluctuations in the local feature amounts, and only the local feature amounts with small fluctuations are accepted.

In step S507, the feature comparison unit 207 compares the rotation-invariant feature amount transmitted from the local feature amount verification unit 206 and the rotation-invariant feature amount registered in the image feature database 107. The comparison is carried out for each registered image registered in the image feature database 107, while the threshold of the affine transform coefficient provided in step S502 is taken into consideration. A score is calculated for each registered image as a result of the comparison. The calculation method of score will be described later with reference to the flow charts of FIGS. 6A and 6B.

In step S508, the feature comparison unit 207 associates the calculated degree of similarity with the image, from which the degree of similarity is calculated, creates a search result list, and sorts the scores in descending order. The feature comparison unit 207 then outputs images with high scores and the scores of the images as the search result 208 in order of sort.

[Calculation Method of Score]

The calculation method of score in the present embodiment (in step S507) will now be described. The rotation-invariant feature amount transmitted from the local feature point extraction unit 204 and the local feature amount calculation unit 205 is designated by Vs, and the coordinates associated with the rotation-invariant feature amount are designated by S(x, y). The rotation-invariant feature amount on an image R registered in the image feature database 107 is designated by Vq, and the coordinates associated with the rotation-invariant feature amount are designated by Q(x', Y').

Figure 6A:
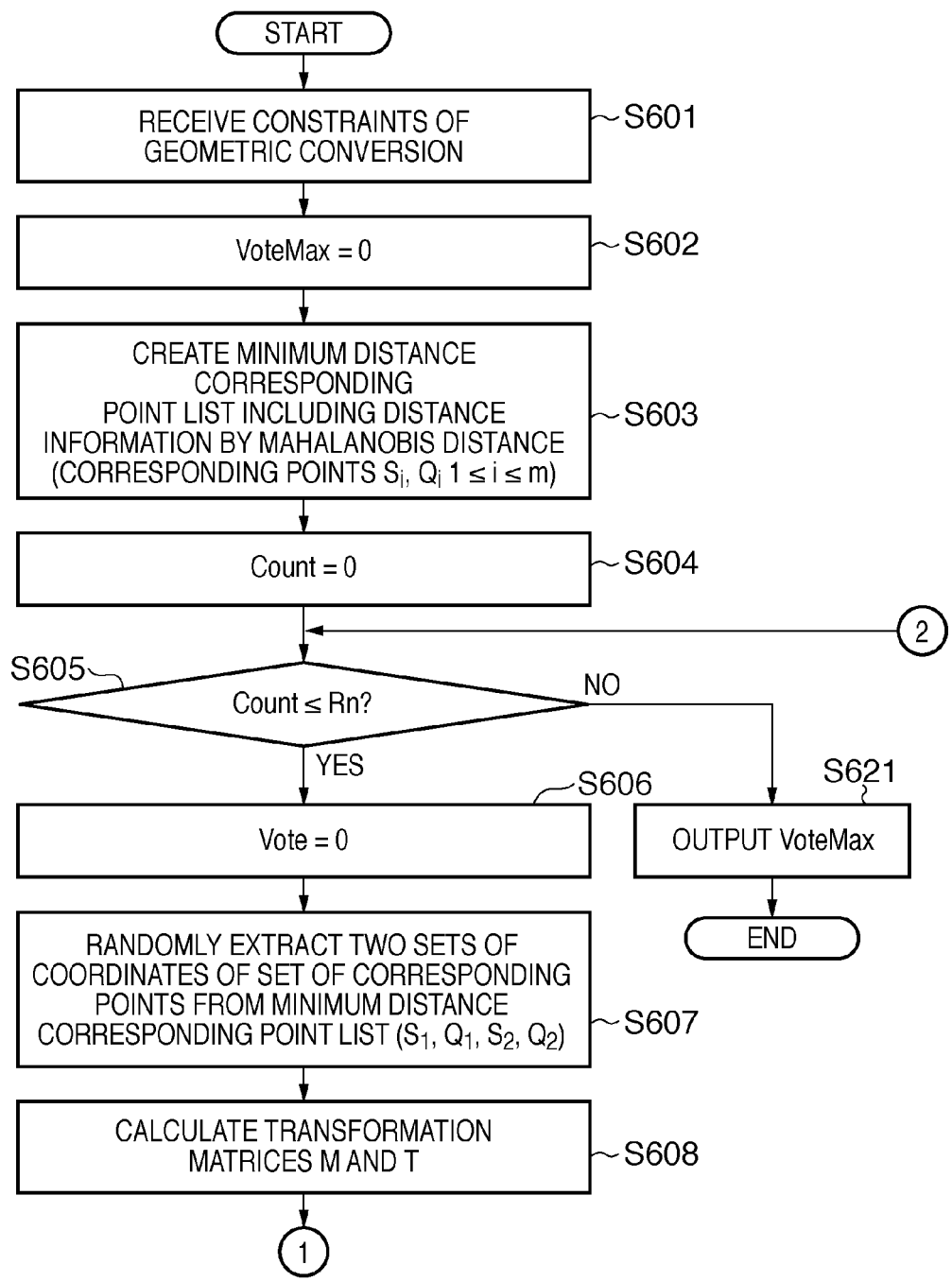
FIGS. 6A and 6B show flow charts showing a comparison process of local features according to the embodiment.
Figure 6B:
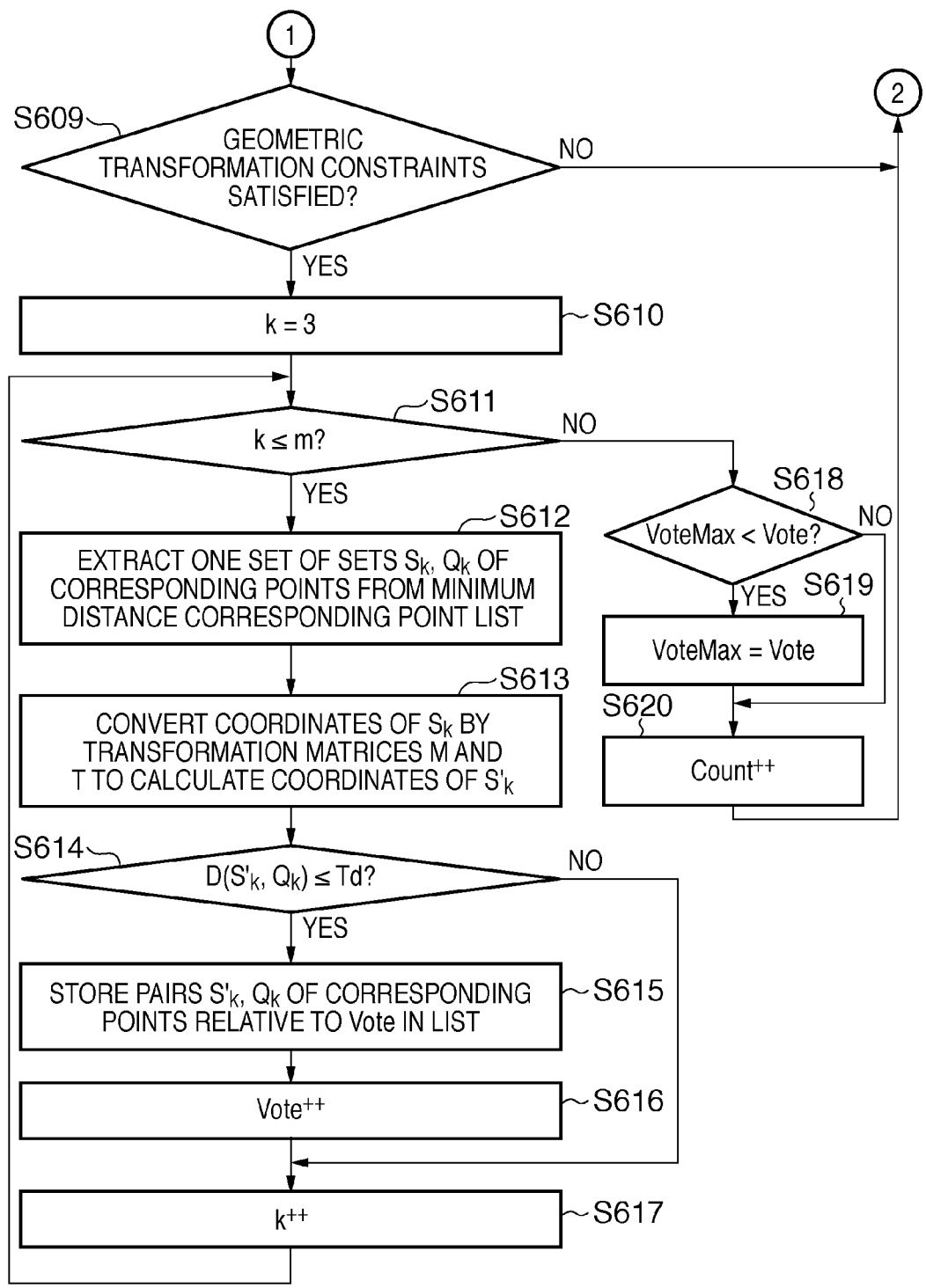

The calculation procedure of the degree of similarity (score) in the feature comparison unit 207 will now be described in accordance with the flow charts shown in FIGS. 6A and 6B.

In step S601, the feature comparison unit 207 receives, from the image input unit 202 (threshold designation processing unit 211), designations of the range of enlargement ratio, the range of rotation angle, and the range of translation of an image to be searched relative to the query image. As described in step S502, not all three items have to be designated, and it is preferable to be able to designate a range of an item for which the user wants to set a limit to.

In step S602, a variable VoteMax indicating the final vote count is initialized to 0. In step S603, all combinations of distances between feature amounts Vq and Vs are calculated, and a minimum distance corresponding point list is created. In this way, the feature points selected from the query image are associated with the feature points of the registered comparison destination images based on the feature amounts, and as a result, a plurality of corresponding pairs of feature points are extracted in the query image and the comparison destination image.

To obtain the minimum distance corresponding points, an observed value for calculating the Mahalanobis distance stored for each feature point of the query image is set to $X=(X1, X2, \ldots, Xp)'$, and an inverse matrix $\Sigma j^{-1}$ of a variance-covariance matrix $\Sigma j$ of a population j and an average (centroid) μ are used to obtain a distance dj based on Formula (8). The minimum distance corresponding point list including the obtained distance and the variance-covariance inverse matrix is created.

$$dj^2 = (X-\mu j)'\Sigma j^{-1}(X-\mu j) \quad (8)$$

More specifically, a combination (corresponding points) of Vq and Vs is extracted so that the calculated distance between feature amounts is smaller than the threshold Tv and is a minimum distance, and the combination is registered in the minimum distance corresponding point list. Hereinafter, the rotation-invariant feature amounts of the corresponding points registered in the minimum distance corresponding point list will be referred to as Vq(k) and Vs(k), respectively, in the description of the present embodiment. Coordinates associated with Vq(k) and Vs(k) are attached by subscripts, such as $Q_k(x'_k, y'_k)$ and $S_k(x_k, y_k)$, respectively. The number of sets of the corresponding points registered in the minimum distance corresponding point list created in step S603 is m.

In step S604, a variable Count indicating repetition counts of the calculation process of the degree of similarity is initialized to 0. In step S605, whether the repetition counts Count is over a predetermined number of maximum repetition processes Rn is determined. If Count is over Rn, the final vote count VoteMax is outputted in step S621, and the process ends. If Count is not over Rn, the process moves to step S606. Details related to the calculation process of an overall degree of similarity of S621 will be described later.

In step S606, a variable Vote indicating the vote count is initialized to 0. In step S607, at least two pairs of feature points are acquired from a plurality of pairs of feature points. In the present embodiment, two sets of coordinates of sets of corresponding points are randomly extracted from the minimum distance corresponding point list generated in step S603. In the present embodiment, the coordinates are referred to as $Q_1(x'_1, y'_1)$ and $S_1(x_1, y_1)$ as well as $Q_2(x'_2, y'_2)$ and $S_2(x_2, y_2)$.

In step S608, a coordinate transformation coefficient for a coordinate transformation process is determined so that the coordinates of two pairs of feature points extracted in step S607 match in the query image and the comparison destination image. In the present embodiment, an affine transform is used as the coordinate transformation process. More specifically, it is assumed that $Q_1(x'_1, y'_1)$ and $S_1(x_1, y_1)$ as well as $Q_2(x'_2, y'_2)$ and $S_2(x_2, y_2)$ extracted in step S607 satisfy the transform shown in Formula (9), and variables a to f in Formula (9) are obtained. However, a matrix constituted by the variables a to d is designated by M, and a matrix constituted by the variables e to f is designated by T in step S608 of the flow chart shown in FIG. 6A.

[Expression 3]
$$\begin{pmatrix} x'_k \\ y'_k \end{pmatrix} = \begin{pmatrix} a & b \\ c & d \end{pmatrix}\begin{pmatrix} x_k \\ y_k \end{pmatrix} + \begin{pmatrix} e \\ f \end{pmatrix} \quad (9)$$

In the present embodiment, only a combination of the rotational transform, the similarity transformation, and translation will be considered for simplification. In this case, Formula (9) is rewritten as Formula (10).

[Expression 4]
$$\begin{pmatrix} x'_k \\ y'_k \end{pmatrix} = \begin{pmatrix} a & -b \\ b & a \end{pmatrix}\begin{pmatrix} x_k \\ y_k \end{pmatrix} + \begin{pmatrix} e \\ f \end{pmatrix} \quad (10)$$

The variables a, b, e, and f are expressed by Formulas (11) to (14) using $x'_1, y'_1, x_1, y_1, x'_2, y'_2, x_2$, and $y_2$.

[Expression 5]
$$a = \frac{(x_1 - x_2)(x'_1 - x'_2) + (y_1 - y_2)(y'_1 - y'_2)}{(x_1 - x_2)^2 + (y_1 - y_2)^2} \quad (11)$$

$$b = \frac{(x_1 - x_2)(y'_1 - y'_2) - (y_1 - y_2)(x'_1 - x'_2)}{(x_1 - x_2)^2 + (y_1 - y_2)^2} \quad (12)$$

$$e = \frac{\begin{aligned}&(y'_1 - y'_2)(x_1 y_2 - x_2 y_1) - \\ &(x'_1 + x'_2)(x_1 x_2 + y_1 y_2) + \\ &x'_1(x_2^2 + y_2^2) + x'_2(x_1^2 + y_1^2)\end{aligned}}{(x_1 - x_2)^2 + (y_1 - y_2)^2}. \quad (13)$$

$$f = \frac{\begin{aligned}&(x'_1 - x'_2)(y_1 x_2 - y_2 x_1) - \\ &(y'_1 + y'_2)(y_1 y_2 + x_1 x_2) + \\ &y'_1(y_2^2 + x_2^2) + y'_2(y_1^2 + x_1^2)\end{aligned}}{(x_1 - x_2)^2 + (y_1 - y_2)^2}. \quad (14)$$

FIG. 7 shows a relationship between the affine transform coefficient and the geometric transformation in Formula (9). Here, a, b, e, and f obtained in Formulas (11) to (14) and constraints b=−c and d=a set during the delivery of Formula (10) in the chart of FIG. 7 will be used.

If a rotation matrix is multiplied by an enlargement/reduction matrix, the rotation matrix times S is just obtained.

Therefore, a constraint $\cos^2\theta + \sin^2\theta = 1$ is used, and the enlargement ratio is obtained by $$\text{enlargement ratio } S = sqrt(a^2 + b^2) \quad (15).$$

Therefore, $$\text{rotation angle } \theta = \cos^{-1}(a/S) \quad (16)$$

is obtained. Obviously, $$\text{translation vector } T = (e, f) \quad (17)$$

is obtained.

In step S609, the feature comparison unit 207 determines whether the amount of transformation of the coordinates based on the coordinate transformation process (affine transform process) using the coordinate transformation coefficient (affine transform coefficient) decided as described above satisfies constraint conditions designated in advance. More specifically, in step S609, the range of enlargement/reduction ratio, the range of rotation angle, and the range of translation vector provided in advance and temporarily stored in step S601 are compared with S, θ, and T obtained in Formulas (15), (16), and (17). As a result of the comparison, the process proceeds to step S610 only if all conditions are satisfied. If there is even one condition that is not satisfied, another corresponding point will be selected in step S605.

Obviously, the items that are not provided by the ranges do not have to be considered. For example, if only the range of enlargement ratio is designated, only whether S obtained in Formula (15) is included in the range would be determined.

In step S610, a corresponding point selection variable k is initialized to 3 to select points other than two sets of points randomly extracted from the minimum distance corresponding point list in step S607. In step S611, whether the corresponding point selection variable k is over the number of sets m of the corresponding points registered in the minimum distance corresponding point list is determined. If k is over m, the process moves to step S618, and this will be described later. If the corresponding point selection variable k is not over the number of sets m of the corresponding points registered in the minimum distance corresponding point list in the determination of step S611, the process proceeds to step S612.

In step S612, the feature comparison unit 207 extracts, from the minimum distance corresponding point list, points other than two sets of points $S_1(x_1, y_1)$ and $S_2(x_2, y_2)$ randomly extracted in step S607 from the minimum distance corresponding point list. In the present embodiment, the extracted points are referred to as $S_k(x_k, y_k)$.

In step S613, the feature comparison unit 207 obtains coordinates $S'_k(x'_k, y'_k)$, which are moved from $S_k(x_k, y_k)$ using Formula (9).

In step S614, the feature comparison unit 207 calculates a geometric distance between the coordinate $S'_k(x'_k, y'_k)$ and the coordinate $Q_k(x'_k, y'_k)$ in Euclidean distance and determines whether the Euclidean distance is equal to or smaller than a threshold Td. If the Euclidean distance is equal to or smaller than the threshold Td, the feature comparison unit 207 stores a pair of corresponding points $S'_k$ and $Q_k$ with respect to Vote in step S615. In step S616, the vote count Vote is incremented, and the process moves to step S617. If the Euclidean distance is greater than the threshold Td, no operation is performed, and the process moves to step S617.

In step S617, the corresponding point selection variable k is incremented, and the process returns to step S611.

Step S618 will now be described, which is a process executed when the corresponding point selection variable k is over the number of sets m of the corresponding points registered in the minimum distance corresponding point list in step S611. The feature comparison unit 207 compares the value of the vote count Vote and the value of the final vote count VoteMax in step S618. If the value of the vote count Vote is greater than the value of the final vote count VoteMax, the feature comparison unit 207 executes a process of step S619. In step S619, the feature comparison unit 207 replaces the value of the final vote count VoteMax by the value of the vote count Vote and then increments Count in step S620. The process returns to step S605. If the value of the vote count Vote is equal to or smaller than the value of the final vote count VoteMax after the comparison between the value of the vote count Vote and the value of the final vote count VoteMax, the feature comparison unit 207 skips step S619 and increments Count in step S620. The process returns to step S605.

As described, according to the first embodiment, whether the amount of transformation of the coordinate transformation process using the coordinate transformation coefficient decided based on the extracted two pairs feature points satisfies the constraint conditions designated in advance is determined. To determine the similarity between the query image and the comparison destination image only if the amount of transformation is determined to satisfy the constraint conditions, the coordinates of the feature point group of one image are transformed by the coordinate transformation process using the coordinate transformation coefficient, and the coordinates are compared with the coordinates of the corresponding feature point group of the other image. Therefore, the image search apparatus according to the present embodiment is configured to verify the fluctuations in the rotation-invariant feature amounts calculated from the query image to not to use the rotation-invariant feature amounts with large fluctuations during search. As a result, a reduction in the search accuracy can be prevented without the execution of unnecessary coordinate transformation processes. Therefore, it is advantageous that the number of repetitions for selecting the feature points from the query can be increased without increasing the process load.

The enlargement/reduction ratio between the query image and the comparison destination image can also be obtained from the ratio between the distances between the feature points in the query image and the distances between the feature points in the comparison destination image in relation to a plurality of pairs of feature points (two pairs of feature points in the first embodiment). If the obtained ratio of enlargement/reduction does not satisfy the constraint conditions designated in advance, the processes of steps S607 and S608 may be prohibited in relation to the plurality of pairs of feature points, and next new pairs of feature points may be acquired. In that case, the execution of the processes from the calculation of the coordinate transformation coefficient (step S608) to the comparison of the coordinate values after the coordinate transformation (step S617) is prohibited. Similarly, the rotation angle can be obtained from angles formed by straight lines connecting the pairs of feature points. Such a configuration further contributes to an advantage of the present embodiment that the number of repetitions of the selection of feature points from the query can be increased without increasing the process load.

Although the combination of the rotational transform, the similarity transformation, and the translation has been described in the score calculation method according to the first embodiment, applicable geometric transforms are not limited to these. Geometric transforms other than the ones described above can also be applied by obtaining transformation matrices corresponding to the transforms in step S608 of the flow chart of FIG. 6A. For example, in the case of the affine transform, the number of coordinates of the set of randomly selected corresponding points is set to 3 in step S607. In step S608, Formula (8) is used instead of Formula (9), and three sets of corresponding points (six points in total) selected in step S606 can be used to obtain the variables a to f.

FIG. 9 shows an example of a UI for providing constraints to the geometric transformation. The UI is provided by the threshold designation processing unit 211.

In the case of enlargement/reduction associated with deformation, $$a \neq d \text{ or } b \neq (-c) \text{ is provided.} \tag{18}$$

Therefore, with reference to the condition, it is possible not to search the deformation. Thus, to perform searching with a constraint of not searching the one with deformation, the process can be moved to step S605 for processing the next corresponding points when Formula (18) is satisfied.

Meanwhile, the mirror image can be detected based on whether the result of dividing a, b, c, and d by S obtained by Formula (15) is −1, 0, 0, and 1. Therefore, the search of mirror image can also be added to the constraints.

It is necessary to control to be able to check only one of "search mirror image" and "do not search deformation".

The ranges of the rotational transform, the similarity transformation, and the translation can be constrained in the same way as in the first embodiment.

As for the rotation, it is obviously possible to execute a direction detection process based on a character recognition (OCR) result of character images in an image to perform direction correction to search for an image in a designated rotation angle range. In the embodiments, the affine transform is applied to the feature points of the query image, and the coordinates after the affine transform and the coordinates of the feature points of the comparison destination image are compared. However, the affine transform may be applied to the feature points of the comparison destination image, and the coordinates after the affine transform and the coordinates of the feature points of the query image may be compared.

As described, according to the first and second embodiments, the narrow-down process of searching can be optimally associated with the processes from the selection of feature points from the query to the geometric transformation. Therefore, excessive geometric transformation processes do not have to be executed, and a checking process of whether narrow-down conditions are met in post-processing does not have to be executed.

As a result, the number of repetitions of selection of feature points from the query can be increased without increasing the process load. This can contribute to the stability and the reproducibility of search.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-125844, filed May 25, 2009, which is hereby incorporated by reference herein in its entirety.

What is claimed is:

1. An image search apparatus that determines a similarity between an input query image and a registered comparison destination image and that searches an image similar to the query image, the image search apparatus comprising:
    an extraction unit configured to extract a plurality of corresponding pairs of feature points in two images, the query image and the comparison destination image, by associating feature points selected from the query image and feature points of the comparison destination image based on feature amounts of the feature points;
    an acquisition unit configured to acquire at least two pairs of feature points from the plurality of pairs of feature points;
    a decision unit configured to decide a coordinate transformation coefficient for performing transformation so that coordinates of the feature points of one of the two images match coordinates of the feature points of the other image, in relation to each pair of the at least two pairs of feature points;
    a calculation unit configured to calculate an amount of transformation of the coordinates by a coordinate transformation process, wherein the calculation is based on the coordinate transformation coefficient;
    a comparison unit configured to compare the calculated amount of transformation to constraint conditions designated in advance; and
    a transformation unit configured to transform the coordinates of the feature points of the one of the images by the coordinate transformation process using the coordinate transformation coefficient in relation to the plurality of pairs of feature points only if said comparison unit determines that the constraint conditions are satisfied and configured to compare the coordinates of the feature points after the transformation with the coordinates of the corresponding feature points of the other image to determine the similarity between the query image and the comparison destination image.

2. The apparatus according to claim 1, wherein
said extraction unit is configured to extract a plurality of rotation-invariant feature points from the query image and the comparison destination image, calculate feature amounts of the plurality of feature points, and associate the feature points of the comparison destination image based on the calculated feature amounts to extract the plurality of pairs of feature points.

3. The apparatus according to claim 1, wherein
the coordinate transformation is an affine transform,
the coordinate transformation coefficient is an affine transform coefficient, and
the constraint conditions are constraint conditions related to the amount of transformation of at least one of a ratio of enlargement/reduction as a result of the affine transform, a size of rotation angle, an amount of translation, presence of deformation, and presence of mirror image conversion.

4. The apparatus according to claim 1, further comprising wherein a ratio of enlargement/reduction is obtained from a ratio between a distance between the feature points in the query image and a distance between the feature points in the comparison destination image in relation to the at least two pairs of feature points acquired by said acquisition unit, and wherein the execution of processes by said decision unit and said comparison unit in relation to the plurality of pairs of feature points is performed if the ratio of enlargement/reduction satisfies constraint conditions designated in advance.

5. The apparatus according to claim 1, further comprising a unit configured to provide a user interface for a user to designate the constraint conditions.

6. An image search method for determining a similarity between an input query image and a registered comparison destination image and for searching for an image similar to the query image, the image search method comprising:
    an extraction step of extracting a plurality of corresponding pairs of feature points in two images, the query image and the comparison destination image, by associating feature points selected from the query image and feature points of the comparison destination image based on feature amounts of the feature points;
    an acquisition step of acquiring at least two pairs of feature points from the plurality of pairs of feature points;
    a decision step of deciding a coordinate transformation coefficient for performing transformation so that coordinates of the feature points of one of the two images match coordinates of the feature points of the other image, in relation to each pair of the at least two pairs of feature points;
    a calculation step of calculating an amount of transformation of the coordinates by a coordinate transformation process, wherein the calculation is based on the coordinate transformation coefficient;
    a comparison step of comparing the calculated amount of transformation to constraint conditions designated in advance; and a transformation step of transforming the coordinates of the feature points of the one of the images by the coordinate transformation process using the coordinate transformation coefficient in relation to the plurality of pairs of feature points if it is determined in said comparison step that the constraint conditions are satisfied, and of comparing the coordinates of the feature points after the transformation with the coordinates of the corresponding feature points of the other image to determine the similarity between the query image and the comparison destination image.

7. The method according to claim 6, wherein
in said extraction step, a plurality of rotation-invariant feature points are extracted from the query image and the comparison destination image, feature amounts of the plurality of feature points are calculated, and the feature points of the comparison destination image are associated based on the calculated feature amounts to extract the plurality of pairs of feature points.

8. The method according to claim 6, wherein
the coordinate transformation is an affine transform,
the coordinate transformation coefficient is an affine transform coefficient, and
the constraint conditions are constraint conditions related to the amount of transformation of at least one of a ratio of enlargement/reduction as a result of the affine transform, a size of rotation angle, an amount of translation, presence of deformation, and presence of mirror image conversion.

9. The method according to claim 6, further comprising
wherein a ratio of enlargement/reduction is obtained from a ratio between a distance between the feature points in the query image and a distance between the feature points in the comparison destination image in relation to the at least two pairs of feature points acquired in said acquisition step, and wherein the execution of processes in said decision step and said comparison step is performed in relation to the plurality of pairs of feature points if the ratio of enlargement/reduction satisfies constraint conditions designated in advance.

10. The method according to claim 6, further comprising
a step of providing a user interface for a user to designate the constraint conditions.

11. A non-transitory computer-readable storage medium storing a computer program for causing a computer to execute the image search method according to claim 6.

* * * * *